(12) United States Patent
Zhang et al.

(10) Patent No.: US 11,262,603 B2
(45) Date of Patent: Mar. 1, 2022

(54) MULTILAYER METAL STACK HEATER

(71) Applicant: ROCKLEY PHOTONICS LIMITED, London (GB)

(72) Inventors: Yi Zhang, Pasadena, CA (US); Chia-Te Chou, Pasadena, CA (US); Sanna Leena Mäkelä, Cardiff (GB)

(73) Assignee: Rockley Photonics Limited, Altrincham (GB)

( * ) Notice: Subject to any disclaimer, the term of this patent is extended or adjusted under 35 U.S.C. 154(b) by 0 days.

(21) Appl. No.: 16/900,714

(22) Filed: Jun. 12, 2020

(65) Prior Publication Data
US 2020/0393707 A1   Dec. 17, 2020

Related U.S. Application Data (60) Provisional application No. 62/861,076, filed on Jun. 13, 2019.

(51) Int. Cl.
*G02F 1/01* (2006.01)

(52) U.S. Cl.
CPC ............ *G02F 1/0147* (2013.01); *G02F 1/011* (2013.01)

(58) Field of Classification Search
CPC ... G02F 1/0147; G02F 1/011; G02B 6/02204; G02B 6/124; G02B 6/13; G02B 6/29322
See application file for complete search history.

(56) References Cited

U.S. PATENT DOCUMENTS

| | | |
|---|---|---|
| 6,192,177 B1 | 2/2001 | Amundson et al. |
| 6,278,168 B1 | 8/2001 | Day |
| 6,849,914 B2 | 2/2005 | Day |
| 7,509,005 B2 | 3/2009 | Sandhu et al. |
| 7,693,354 B2 | 4/2010 | Carothers |
| 7,706,647 B2 | 4/2010 | Sandhu et al. |
| 8,150,223 B2 | 4/2012 | Li et al. |
| 9,588,360 B2 | 3/2017 | Feng et al. |
| 9,684,191 B2 | 6/2017 | Gill et al. |
| 9,778,494 B1 | 10/2017 | Feng et al. |
| 10,571,723 B2 | 2/2020 | Guzzon et al. |

(Continued)

FOREIGN PATENT DOCUMENTS

| | | |
|---|---|---|
| CN | 108227084 A | 6/2018 |
| GB | 2 339 919 A | 2/2000 |

(Continued)

OTHER PUBLICATIONS

Deenadayalan, V. et al., "Fabrication of Silicon photonic circuits with integrated thermo-optic heaters for education", ASMC, 2019, IEEE.

(Continued)

*Primary Examiner* — John Bedtelyon
(74) *Attorney, Agent, or Firm* — Lewis Roca Rothgerber Christie LLP (57) ABSTRACT

A silicon photonic integrated circuit with a heater. In some embodiments, the silicon photonic integrated circuit includes a first waveguide, on a top surface of the silicon integrated circuit, and a heater element, on the first waveguide. The heater element may include a first metal layer, on the first waveguide, and a second metal layer, on the first metal layer, the second metal layer having a different composition than the first metal layer, the second layer having a thickness of less than 300 nm.

17 Claims, 4 Drawing Sheets

(56) References Cited

U.S. PATENT DOCUMENTS

| | | |
|---|---|---|
| 2003/0057428 A1 | 3/2003 | Day |
| 2004/0071386 A1* | 4/2004 | Nunen .................. G02F 1/065 385/14 |
| 2004/0071401 A1 | 4/2004 | Eldada et al. |
| 2004/0197064 A1 | 10/2004 | Kawamonzen et al. |
| 2004/0202420 A1 | 10/2004 | Rogers et al. |
| 2004/0258344 A1 | 12/2004 | Fardi et al. |
| 2006/0098911 A1 | 5/2006 | Sandhu et al. |
| 2006/0228084 A1 | 10/2006 | Sandhu et al. |
| 2008/0181550 A1 | 7/2008 | Earnshaw |
| 2009/0110342 A1 | 4/2009 | Webster et al. |
| 2009/0297092 A1 | 12/2009 | Takahashi |
| 2010/0054653 A1 | 3/2010 | Carothers |
| 2010/0247029 A1 | 9/2010 | Li et al. |
| 2011/0280512 A1 | 11/2011 | Abe et al. |
| 2012/0087613 A1 | 4/2012 | Rasras |
| 2014/0010248 A1 | 1/2014 | Larson |
| 2014/0321488 A1 | 10/2014 | Chen et al. |
| 2016/0170239 A1 | 6/2016 | Feng et al. |
| 2017/0131576 A1 | 5/2017 | Gill et al. |
| 2017/0269391 A1 | 9/2017 | Feng et al. |
| 2018/0100966 A1 | 4/2018 | Meister et al. |
| 2019/0258094 A1 | 8/2019 | Oh et al. |

FOREIGN PATENT DOCUMENTS

| | | |
|---|---|---|
| GB | 2554460 A | 4/2018 |
| WO | WO 02/31555 A2 | 4/2002 |
| WO | WO 02/44777 A1 | 6/2002 |
| WO | WO 2009/032820 A1 | 3/2009 |
| WO | WO 2016/165708 A1 | 10/2016 |

OTHER PUBLICATIONS

Gao, S. et al., "Power-Efficient Thermal Optical Tunable Grating Coupler Based on Silicon Photonic Platform", IEEE Photonics Technology Letters, Apr. 1, 2019, pp. 537-540, vol. 31, No. 7, IEEE.

U.K. Intellectual Property Office Search Report, dated Nov. 13, 2020, for Patent Application No. GB2008988.4, 4 pages.

U.K. Intellectual Property Office Search and Examination Report, dated Aug. 13, 2018, for Patent Application No. GB1802763.1, 9 pages.

U.K. Intellectual Property Office Search and Examination Report, dated Aug. 6, 2021, for Patent Application No. GB 2107324.2, 5 pages.

U.S. Office Action from U.S. Appl. No. 16/281,035, dated Aug. 21, 2020, 8 pages.

U.S. Office Action from U.S. Appl. No. 16/281,035, dated Apr. 2, 2021, 7 pages.

* cited by examiner

MULTILAYER METAL STACK HEATER

CROSS-REFERENCE TO RELATED APPLICATION(S)

The present application claims priority to and the benefit of U.S. Provisional Application No. 62/861,076, filed Jun. 13, 2019, entitled "TiW—Au—TiW STACK FOR METAL HEATERS", the entire content of which is incorporated herein by reference.

The present application is related to U.S. patent application Ser. No. 16/281,035, filed Feb. 20, 2019, which is incorporated herein by reference.

FIELD

One or more aspects of embodiments according to the present disclosure relate to a heater, and more particularly to a multilayer heater.

BACKGROUND

Silicon has a relatively high thermo-optic coefficient, which may be used for tuning the phase delay of a silicon waveguide. To adjust the temperature of such a waveguide, current may be driven through a metal heater element, e.g., by a CMOS or SiGe circuit (e.g. by a CMOS or SiGe integrated circuit). One application of such tuning is to use a resistive metal heater element to tune the wavelength response of a DBR grating, to compensate for variations introduced by device geometry tolerances.

The resistance of the heater depends on the resistivity of the material used to form the heater element, and on the dimensions of the heater element. The dimensions of the heater element may be constrained by the fabrication process, and also by requirements to avoid imposing high mechanical stresses on the waveguide. These constraints may be an obstacle to the use of, e.g., a TiW heater element, which, under these constraints, may have a resistance that is too great to be effectively driven by certain drive circuits.

For example, it may be that the target heater resistance is 80 ohms, while a 150 nm thick layer of TiW may have a resistance between 400 ohms and 1,100 ohms. In some embodiments a dedicated lithography layer (e.g., a nickel layer) may be used to create a heater element, but such an approach may add complexity and cost.

Thus, there is a need for an improved heater.

SUMMARY

According to an embodiment of the present invention, there is provided a silicon photonic integrated circuit, including: a first waveguide, on a top surface of the silicon photonic integrated circuit; and a heater element, on the first waveguide, the heater element including: a first metal layer, on the first waveguide, and a second metal layer, on the first metal layer, the second metal layer having a different composition than the first metal layer, the second layer having a thickness of less than 300 nm.

In some embodiments, the first metal layer is a barrier layer.

In some embodiments, the second metal layer has a sheet resistance lower than that of the first metal layer by at least a factor of three.

In some embodiments, the conductivity of the second metal layer is greater than three times the conductivity of the first metal layer.

In some embodiments, the first metal layer is composed of titanium tungsten.

In some embodiments, the second metal layer is composed of gold.

In some embodiments, the second metal layer has a thickness less than 100 nm.

In some embodiments, the second metal layer has a thickness less than 50 nm.

In some embodiments, the second metal layer has a thickness less than 30 nm.

In some embodiments, the heater element further includes a third metal layer on the second metal layer, the third metal layer having a different composition than the second metal layer.

In some embodiments, the third metal layer is composed of titanium tungsten.

In some embodiments, the silicon photonic integrated circuit further includes: a first contact pad at, and electrically connected to, a first end of the heater element, and a second contact pad at, and electrically connected to, a second end of the heater element, the first contact pad having an upper surface suitable for forming a wire bond, the first contact pad not being on the first waveguide.

In some embodiments, the first contact pad includes: a first metal layer contiguous with the first metal layer of the heater element and a second metal layer contiguous with the second metal layer of the heater element.

In some embodiments, the first contact pad further includes a third metal layer and a fourth metal layer.

In some embodiments, the heater element further includes a third metal layer, contiguous with the third metal layer of the first contact pad.

In some embodiments, the silicon photonic integrated circuit further includes: a thermal isolation trench configured to reduce the rate at which heat is conducted away from the first waveguide or the heater element, or a thermal isolation cavity configured to reduce the rate at which heat is conducted away from the first waveguide or the heater element, or an electrode cavity configured to reduce the rate at which heat is conducted away from the first waveguide or the heater element.

According to an embodiment of the present invention, there is provided a system, including: the silicon photonic integrated circuit, and a drive circuit for driving a heating current through the heater element.

In some embodiments, the system further includes: a temperature sensor, and a controller including the drive circuit, the controller being configured to adjust the heating current to: reduce the heating current when a temperature sensed by the temperature sensor is greater than a setpoint and increase the heating current when a temperature sensed by the temperature sensor is less than the setpoint.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a multilayer heater provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
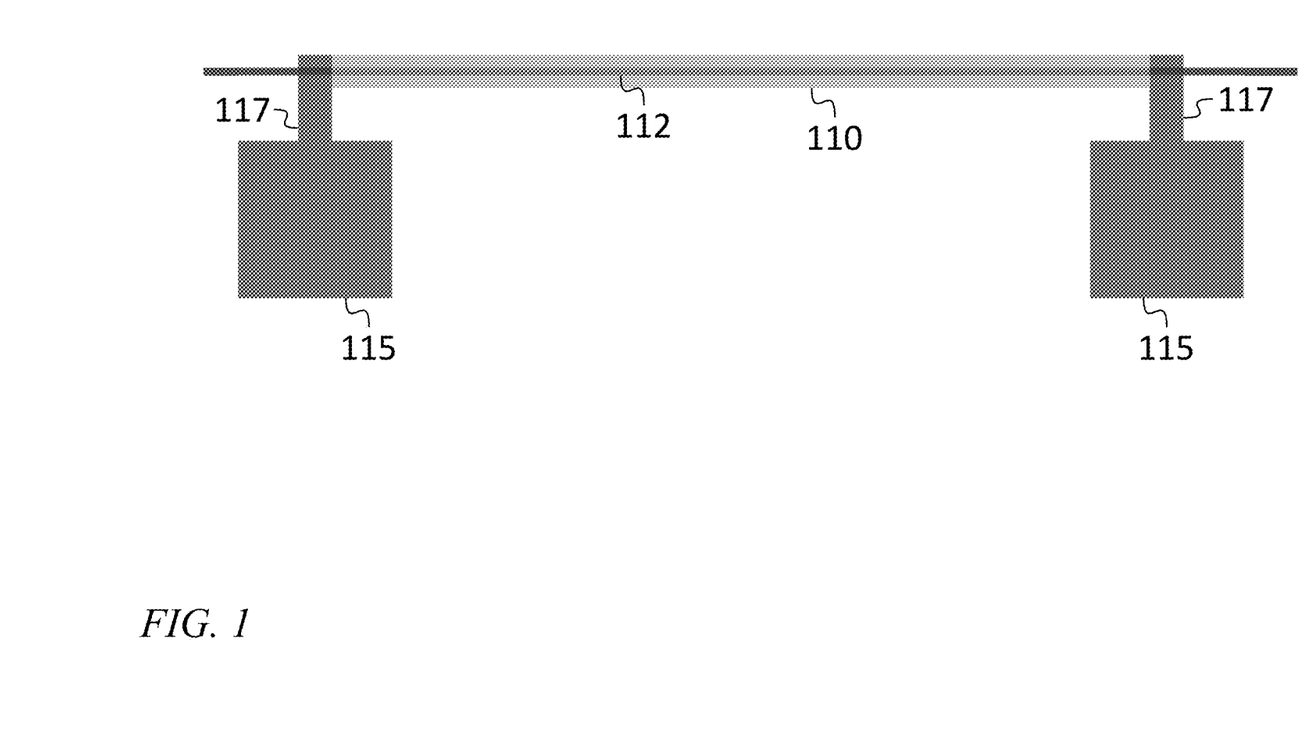
FIG. 1 is a schematic top view of a portion of a photonic integrated circuit, according to an embodiment of the present disclosure.

FIG. 1 shows a top view of a photonic integrated circuit (PIC) (e.g., a silicon photonic integrated circuit) including, on its top surface, a waveguide 112 (e.g., a DBR waveguide) including a distributed Bragg reflector (DBR). The characteristics of the distributed Bragg reflector may vary with variations in the fabrication process and may also vary with temperature. As such, it may be advantageous to adjust the temperature, e.g., by heating the waveguide, to compensate for variations due to fabrication process variations, or to keep the temperature constant, or both.

To this end, a heater element 110, which may be a resistive strip, may be formed on the waveguide, and a heating current may be driven through the heater element 110 to cause the heater element 110 to generate heat, heating the waveguide 112. A drive circuit for providing the heating current may be connected to the heater element 110 through wire bonds connected to a first contact pad 115 and a second contact pad 115 at, and electrically connected to, respective ends of the heater element 110. The heater element 110 may be a rectangle having a length and width approximately the same as the portion of the waveguide 112 that contains the distributed Bragg reflector, so that all of the distributed Bragg reflector is heated, and so that the amount of other material, heating of which is not needed (e.g., other parts of the waveguide, or regions of the photonic integrated circuit adjacent to the waveguide) is relatively small, to avoid wasting heating power.

Figure 2A:
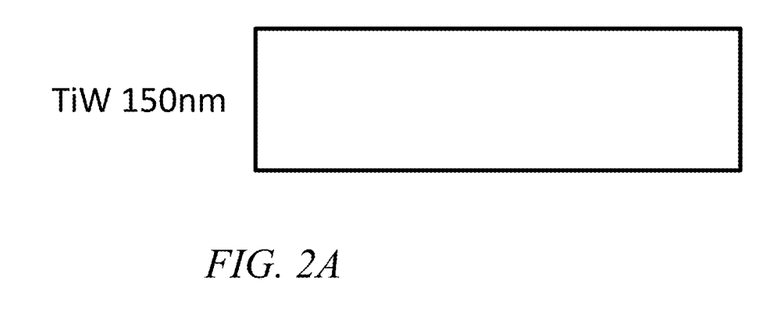
FIG. 2A is a schematic side or cross-sectional view of a single layer heater element, according to an embodiment of the present disclosure.

FIG. 2A shows a single layer heater element composed of titanium tungsten (TiW) (with, e.g., a composition of about 30 atomic percent, or 10 weight percent titanium, the remainder being tungsten). The dimensions of the heater element 110, as determined approximately by the dimensions of the portion of the waveguide 112 that contains the distributed Bragg reflector, may be about 14 microns (in width) by 800 microns to 1100 microns (in length), and the resistance of the heater element 110, at a thickness of 150 nm, may be too great (e.g., between 400 ohms and 1100 ohms for a sheet resistance of about 10 ohms per square) to be efficiently driven by a readily available drive circuit, which may be better suited to driving a resistance of about 80 ohms. Increasing the thickness of the titanium tungsten heater element 110 (to reduce its resistance) may result in unacceptable stress in the underlying material, and may also result in a height that may cause mechanical interference with other elements on or near the photonic integrated circuit.

Figure 2B:
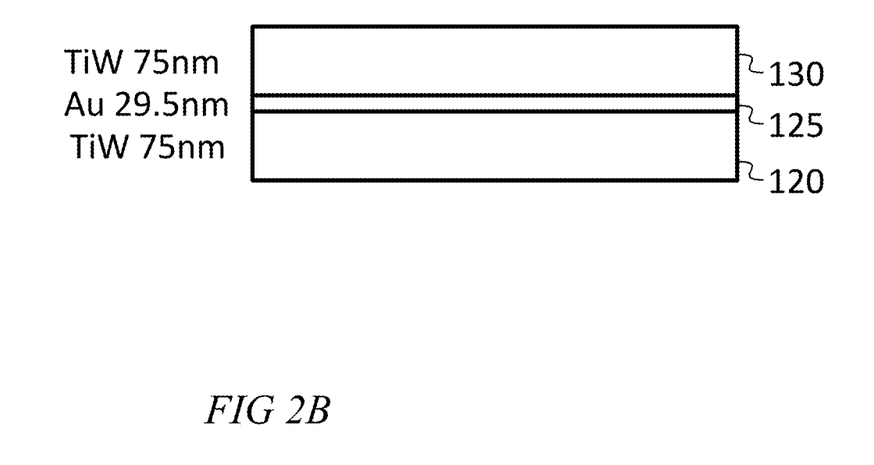
FIG. 2B is a schematic side or cross-sectional view of a three-layer heater element, according to an embodiment of the present disclosure.

FIG. 2B is a drawing of a three-layer heater element 110 including a first metal layer 120 composed of titanium tungsten, a second metal layer 125 composed of gold (Au) and a third metal layer 130 composed of titanium tungsten. The total thickness of the three-layer heater element 110 may be slightly greater than that of the single layer heater element, but its resistance may be significantly smaller, because of the high conductivity of gold (titanium tungsten may have a conductivity of between 75 and 200 micro ohms cm, and gold may have a conductivity of about 2.5 micro ohms cm). In some embodiments, the stack of metal layers in the heater element 110 may include (e.g., consist of) a first metal layer 120, composed of titanium tungsten, having a thickness of (or within 30% of) 75 nm, a second metal layer 125, composed of gold, having a thickness of (or within 30% of) 29.5 nm, and a third metal layer 130, composed of titanium tungsten, having a thickness of (or within 30% of) 75 nm. In some embodiments, the third metal layer 130 instead has a thickness of (or within 30% of) 150 nm.

Figure 3:
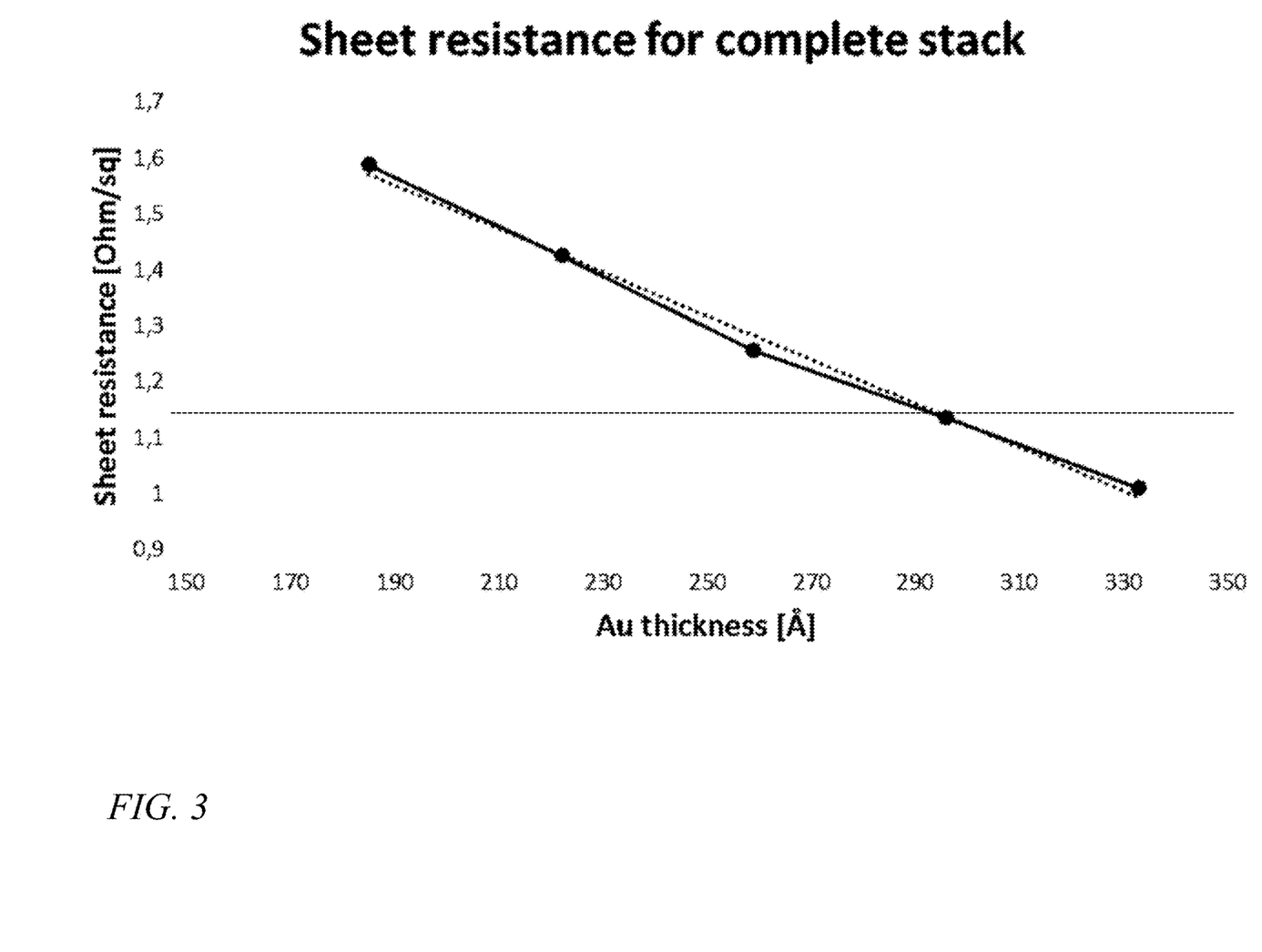
FIG. 3 is a graph of sheet resistance, according to an embodiment of the present disclosure.
Figure 4A:
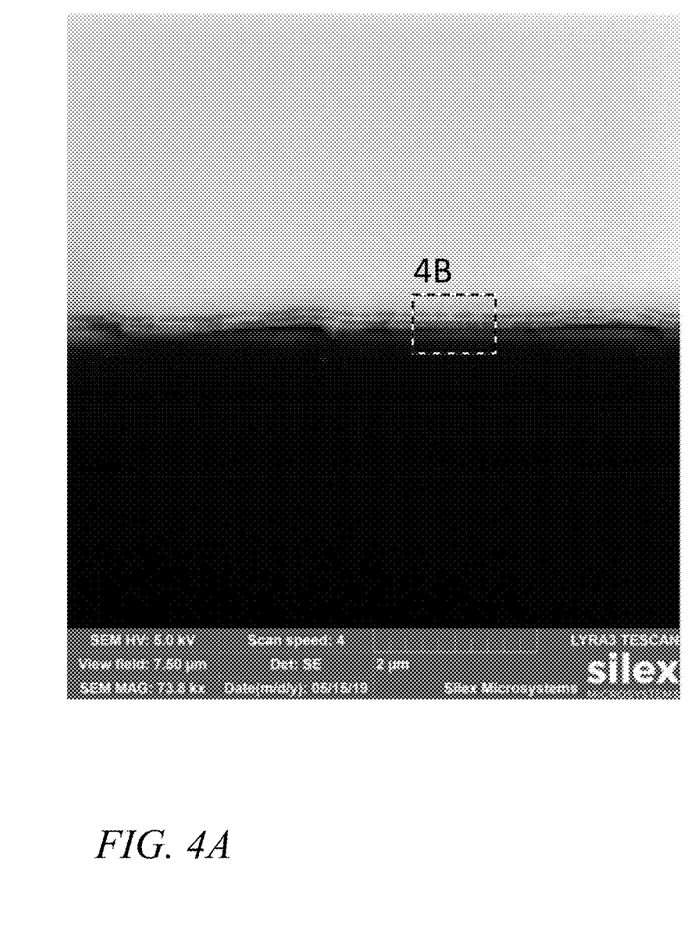
FIG. 4A is an electron micrograph of a three-layer heater element, according to an embodiment of the present disclosure.
Figure 4B:
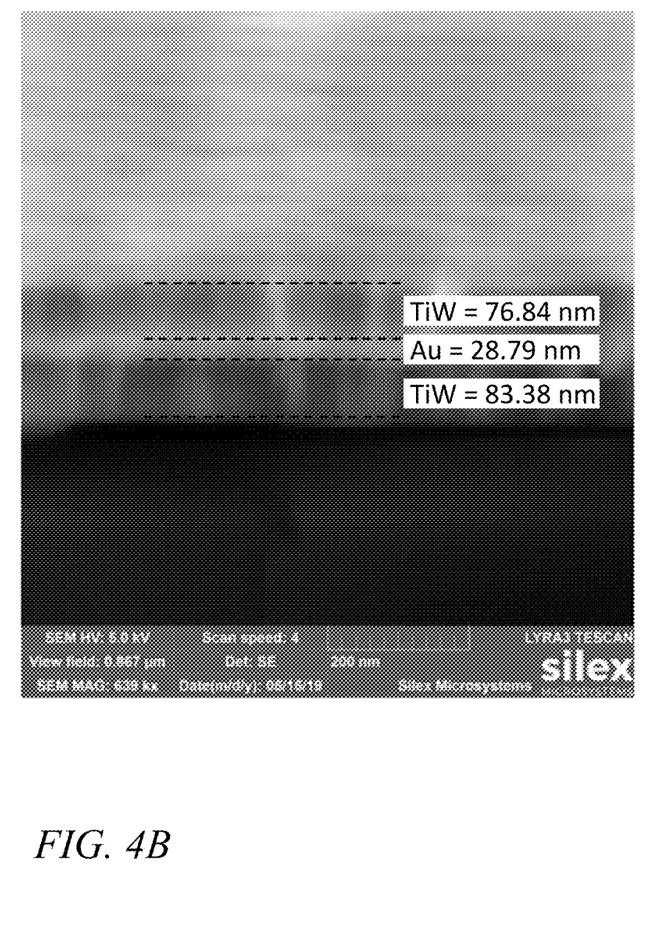
FIG. 4B is an electron micrograph, at increased magnification, of portion 4B of FIG. 4A, according to an embodiment of the present disclosure.

The graph of FIG. 3 shows the sheet resistance of the three-layer heater element 110 as a function of the thickness of the second metal layer (the solid curve is a piecewise linear curve connecting the five dots, each of which is a measured value, and the dotted curve is an approximate linear fit to the measurements). It may be seen that a sheet resistance of about 1.15 ohms per square may be achieved with a gold layer having a thickness of about 295 angstroms, resulting in a resistance, for the heater element (which may have an aspect ratio corresponding to about 70 squares) of about 80 ohms.

In some embodiments a different thickness may be used for the second metal layer, e.g., a thickness between 5.0 nm and 300 nm, to achieve a different heater element resistance. The first metal layer may have a thickness between 20 nm and 200 nm, and the third metal layer may have a thickness between 20 nm and 200 nm.

The first contact pad 115 and the second contact pad 115 may include the same three metal layers, and one or more additional metal layers on top of the three metal layers. For example, each of the first contact pad 115 and the second contact pad 115 may include a fourth metal layer, e.g., a gold layer, on top of the third metal layer, to make the contact pads suitable for use as wire bond pads, so that wire bonds may be used to form electrical connections to the two ends of the heater element 110. In some embodiments, the stack of metal layers in each of the first contact pad 115 and the second contact pad 115 may include (e.g., consist of) a first layer, composed of titanium tungsten, having a thickness of (or within 30% of) 75 nm, a second layer, composed of gold, having a thickness of (or within 30% of) 29.5 nm, a third layer, composed of titanium tungsten, having a thickness of (or within 30% of) 75 nm, and a fourth layer, composed of gold, having a thickness of (or within 30% of) 700 nm. In some embodiments, the third layer instead has a thickness of (or within 30% of) 150 nm. The structure of FIG. 1 may be fabricated by depositing the four layers of metal in the shape shown (including the heater element 110, the first contact pad 115, and the second contact pad 115) and etching away the fourth metal layer in the region of the heater element 110, so that only three metal layers remain in the heater element 110. In some embodiments, the third metal layer 130 acts as a mask to protect the thin second metal layer 125 during subsequent fabrication steps (e.g., deposition or etching steps) that may be performed, after the construction of the heater, with the wafer upon which the silicon photonic integrated circuit is fabricated.

In some embodiments more or fewer layers may be present in the heater element 110 or in the contact pads. For example, the heater element 110 may include only the first metal layer and the second metal layer, and in some embodiments the contact pads may include additional metal layers, e.g., if they are formed as part of a process for forming other structures such as under bump metallization. In an embodiment with only two metal layers, the lower layer may be titanium tungsten having a thickness of (or within 30% of) 75 nm and the upper layer may be gold, having a thickness of (or within 30% of) 29.5 nm within the heater element 110, and having a thickness of (or within 30% of) 700 nm within each of the first contact pad 115, and the second contact pad 115. In such an embodiment, the upper layer may be formed by first depositing a thin layer of gold (e.g., a layer of gold having a thickness of (or within 30% of) 29.5 nm) over the areas of each of the first contact pad 115, and the second contact pad 115 and the heater element 110, then masking off an area including the area of the heater element 110, leaving exposed the first contact pad 115 and the second contact pad 115, and depositing additional gold until the layer of gold on each of the first contact pad 115 and the second contact pad 115 has reached the target thickness (e.g., a thickness of (or within 30% of) 700 nm).

In some embodiments electromigration within the second metal layer 125 may be avoided, or the rate of electromigration may be reduced to an acceptable rate, for example by driving the heater using a drive circuit configured to produce an AC heater current, or by reducing the rate at which heat is conducted away from the heater element 110 or the waveguide 112, thereby reducing the required heater current. For example, one or more thermal isolation trenches, or one or more cavities (which may be referred to as "thermal isolation cavities" or "undercuts") may be formed under the waveguide 112 or under the heater element 110, to reduce the rate at which heat is conducted away from the heater element 110 or the waveguide 112. Further, cavities (which may be referred to as "electrode cavities") may be formed in the conductive traces 117 (FIG. 1) connecting the first contact pad 115 and the second contact pad 115 to the heater element 110, to reduce the rate at which heat may be conducted away from the heater element 110 and the waveguide 112 through these traces 117. The thermal isolation trenches, the undercuts, and the electrode cavities may be constructed as described and illustrated in U.S. patent application Ser. No. 16/281,035, (the '035 application) which is incorporated herein by reference (e.g., in FIG. 8B of the '035 application, showing isolation trenches 701 and an undercut 702, and in FIGS. 13 and 14 of the '035 application, showing electrode cavities 1101). In some embodiments, such measures may make it possible to maintain a waveguide temperature exceeding by 3° C. the temperature of the surrounding parts of the photonic integrated circuit with a heater current that is sufficiently low to result in a mean time to failure, due to electromigration, exceeding 100,000 hours.

In some embodiments a temperature sensor may be included in or on the PIC near or on the waveguide, and a control circuit (which may include the drive circuit) may sense the temperature and feed back to the heater current (or "heating current"), to control the temperature, so as to keep it near a setpoint.

As used herein, a "barrier layer" is a layer that prevents material on one side of it from diffusing into (and contaminating) material on the other side of it. As such, the first metal layer (the first TiW layer) of the heater element 110 may act as a diffusion barrier; it may prevent Au from intermixing with, or diffusing into, the PIC (e.g., the silicon in the PIC). In some embodiments, materials other than TiW may be used in the barrier layer or layers, e.g., Pt, Cr, Ni, NiV, Ti, or W (or combinations thereof) may be used instead of, or in addition to, TiW. In some embodiments, materials other than gold may be used in the second layer, e.g., copper or aluminum (or combinations thereof) may be used instead of, or in addition to, gold.

As used herein, the word "or" is inclusive, so that, for example, "A or B" means any one of (i) A, (ii) B, and (iii) A and B. As used herein, when a second number is "within Y %" of a first number, it means that the second number is at least $(1-Y/100)$ times the first number and the second number is at most $(1+Y/100)$ times the first number.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "primary component" refers to a component that is present in a composition, polymer, or product in an amount greater than an amount of any other single component in the composition or product. In contrast, the term "major component" refers to a component that makes up at least 50% by weight or more of the composition, polymer, or product. As used herein, the term "major portion", when applied to a plurality of items, means at least half of the items. As used herein, any structure or layer that is described as being "made of" or "composed of" a substance should be understood (i) in some embodiments, to contain that substance as the primary component or (ii) in some embodiments, to contain that substance as the major component.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

As used herein, "a portion of" something means all, or less than all, of the thing. As such, for example "a portion of a layer" means all or less than all of the layer.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of multilayer heater have been specifically described and illustrated herein, many modifications and variations will be apparent to those skilled in the art. Accordingly, it is to be understood that a multilayer heater constructed according to principles of this disclosure may be embodied other than as specifically described herein. The invention is also defined in the following claims, and equivalents thereof.

What is claimed is:

1. A silicon photonic integrated circuit, comprising:
   a first waveguide, on a top surface of the silicon photonic integrated circuit;
   a heater element, on the first waveguide;
   a first contact pad at, and electrically connected to, a first end of the heater element, the first contact pad having an upper surface suitable for forming a wire bond in a region spaced apart from the first waveguide in a plan view; and
   a second contact pad at, and electrically connected to, a second end of the heater element,
   the heater element comprising:
   a first metal layer, on the first waveguide, and
   a second metal layer, on the first metal layer,
   the second metal layer having a different composition than the first metal layer,
   the second metal layer having a thickness of less than 300 nm.

2. The silicon photonic integrated circuit of claim 1, wherein the first metal layer is a barrier layer.

3. The silicon photonic integrated circuit of claim 1, wherein the second metal layer has a sheet resistance lower than that of the first metal layer by at least a factor of three.

4. The silicon photonic integrated circuit of claim 1, wherein the conductivity of the second metal layer is greater than three times the conductivity of the first metal layer.

5. The silicon photonic integrated circuit of claim 1, wherein the first metal layer is composed of titanium tungsten.

6. The silicon photonic integrated circuit of claim 1, wherein the second metal layer is composed of gold.

7. The silicon photonic integrated circuit of claim 1, wherein the second metal layer has a thickness less than 100 nm.

8. The silicon photonic integrated circuit of claim 1, wherein the second metal layer has a thickness less than 50 nm.

9. The silicon photonic integrated circuit of claim 8, wherein the second metal layer has a thickness less than 30 nm.

10. The silicon photonic integrated circuit of claim 1, wherein the heater element further comprises a third metal layer on the second metal layer, the third metal layer having a different composition than the second metal layer.

11. The silicon photonic integrated circuit of claim 10, wherein the third metal layer is composed of titanium tungsten.

12. The silicon photonic integrated circuit of claim 1, wherein the first contact pad comprises:
   a first metal layer contiguous with the first metal layer of the heater element and
   a second metal layer contiguous with the second metal layer of the heater element.

13. The silicon photonic integrated circuit of claim 12, wherein the first contact pad further comprises a third metal layer and a fourth metal layer.

14. The silicon photonic integrated circuit of claim 13, wherein the heater element further comprises a third metal layer, contiguous with the third metal layer of the first contact pad.

15. The silicon photonic integrated circuit of claim 1, further comprising:
   a thermal isolation trench configured to reduce the rate at which heat is conducted away from the first waveguide or the heater element, or
   a thermal isolation cavity configured to reduce the rate at which heat is conducted away from the first waveguide or the heater element, or
   an electrode cavity configured to reduce the rate at which heat is conducted away from the first waveguide or the heater element.

16. A system, comprising:
   the silicon photonic integrated circuit of claim 1, and
   a drive circuit for driving a heating current through the heater element.

17. The system of claim 16, further comprising:
   a temperature sensor, and
   a controller comprising the drive circuit,
   the controller being configured to adjust the heating current to:

reduce the heating current when a temperature sensed by the temperature sensor is greater than a setpoint and increase the heating current when a temperature sensed by the temperature sensor is less than the setpoint.

* * * * *